Patented Feb. 19, 1929.

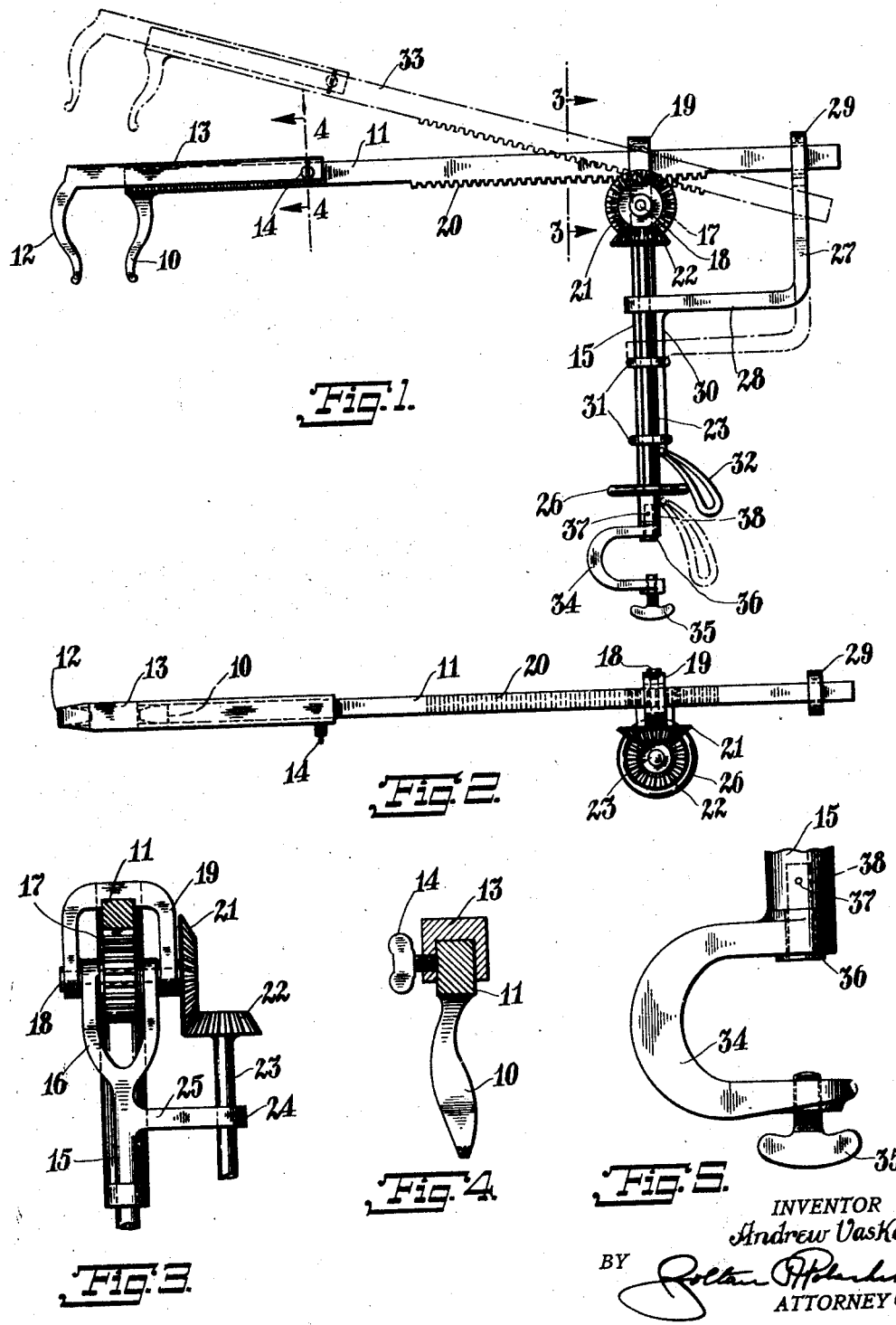

1,702,487

UNITED STATES PATENT OFFICE.

ANDREW VASKO, OF DETROIT, MICHIGAN.

TOOTH EXTRACTOR.

Application filed June 4, 1926, Serial No. 113,644. Renewed August 16, 1928.

This invention relates generally to tooth extracting devices such as used by dentists to extract teeth, the invention having more particular reference to a novel type of tooth extracting device.

The invention has for an object the provision of an improved tooth extracting device of simple construction and arrangement of parts and positive action.

A further object of the invention is the provision of an improved tooth extracting device embodying certain adjustable features so as to render the said device more readily adapted to the purpose intended.

For further comprehension of the invention, and of the objects and advantages thereof reference will be had to the following description and accompanying drawing, and to the appended claims in which the various novel features of the invention are more particularly set forth.

Fig. 1, of the drawing, is a side elevational view of my improved tooth extracting device.

Fig. 2, is a top plan view thereof.

Fig. 3, is an enlarged transverse fragmentary sectional view taken on the line 3—3 of Fig. 1.

Fig. 4, is a similar view taken on the line 4—4 of Fig. 1.

Fig. 5, is an enlarged fragmentary view of the clamping member as used in connection with my improved device.

As here embodied my improved tooth extracting device comprises a prong shaped member 10, having an extended element 11, and a prong shaped member 12 having an extended element 13, adapted to slidably engage the extended element 11 of the said prong shaped member 10, and provided with a set screw 14 threadedly attached thereto, so as to rigidly hold the extended element 13 in any desired extended position. It being understood that the prong shaped members 10 and 12 are adapted to grip the tooth to be extracted.

The support 15 is provided with an upper forked shaped element 16, adapted to rotatively support a pinion 17, as at 18, by a pin or the like, rigidly attached to the said pinion. The supplementary support 19, is pivotally attached to the pin 18, and is adapted to slidably and pivotally support the extended element 11 of the prong shaped member 10. The said extended element 11 provided with teeth 20 adapted to engage the pinion 17. The bevel gear 21 is rigidly attached to the pin 18, and meshes with a bevel pinion 22, rigidly attached to the shaft 23, rotatively supported, as at 24, in extended elements 25 of the said support 15, the hand wheel 26 is rigidly attached to the shaft 23. The above described construction being such as will permit the extended element 11 of the prong shaped member 10 to be extended as may be desired.

The vertical element 27 of the arm 28, is provided with an upper aperture 29, adapted to slidably engage the extended element 11 of the prong shaped member 10, and is rigidly attached to the rod 30, slidably supported, by clamps 31 rigidly attached to the support 15. The rod 30 has rigidly attached thereto, at its lower extremity a handle 32. The above described construction being such as will permit the extended element 11 of the prong shaped member 10, to be pivoted, as designated by the dot and dash lines 33, Fig. 1, of the accompanying drawing, which will pull the tooth to be extracted.

The clamping member 34, is adapted to removably engage the arm, or the like, of a dentist's chair, and is rigidly attached thereto by a set screw 35 threadedly attached thereto. The clamping member 34 has threadedly attached thereto, a stud 36, having an extended element 37, adapted to engage an aperture 38, suitably formed in the lower extremity of the support 15, so as to pivotally support the said support 15.

While I have above described the preferred form, construction, and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:—

1. A tooth extracting device comprising a prong shaped member having an extended element, a second prong shaped member having an extended element adapted to slidably engage the said extended element of the said prong shaped member, said extended element of the said second prong shaped member provided with a means of rigidly holding the said extended element of the said second prong shaped member in a desired extended position so as to grip the tooth to be extracted.

2. A tooth extracting device comprising a prong shaped member having an extended element, a second prong shaped member having an extended element adapted to slidably engage the said extended element of the said prong shaped member, said extended element of the said second prong shaped member provided with a means of rigidly holding the said extended element of the said second prong shaped member in a desired extended position so as to grip the tooth to be extracted, a support adapted to rotatively support a pinion by a pin, a supplementary support pivotally attached to the said pin, and adapted to slidably and pivotally support the said extended element of the said prong shaped member, said extended element provided with teeth adapted to engage the said pinion, a bevel gear rigidly attached to the said pin, and meshing with a bevel pinion rigidly attached to a shaft rotatively supported in extended elements of the said support, a hand wheel rigidly attached to the said shaft, so as to permit the said extended element of the said prong shaped member to be extended.

3. A tooth extracting device comprising a prong shaped member having an extended element, a second prong shaped member having an extended element adapted to slidably engage the said extended element of the said prong shaped member, said extended element of the said second prong shaped member provided with a means of rigidly holding the said extended element of the said second prong shaped member in a desired extended position so as to grip the tooth to be extracted, a support adapted to rotatively support a pinion by a pin, a supplementary support pivotally attached to the said pin, and adapted to slidably and pivotally support the said extended element of the said prong shaped member, said extended element provided with teeth adapted to engage the said pinion, a bevel gear rigidly attached to the said pin, and meshing with a bevel pinion rigidly attached to a shaft rotatively supported in extended elements of the said support, a hand wheel rigidly attached to the said shaft, so as to permit the said extended element of the said prong shaped member to be extended, a vertical element of an arm, provided with an aperture adapted to slidably engage the extended element of the said prong shaped member, said arm rigidly attached to a rod slidably supported by clamps attached to the said support, a handle rigidly attached to the lower extremity of the said rod, so as to permit the said extended element of the said prong shaped member to be pivoted, so as to pull the said tooth to be extracted.

4. A tooth extracting device comprising a prong shaped member having an extended element, a second prong shaped member having an extended element adapted to slidably engage the said extended element of the said prong shaped member, said extended element of the said second prong shaped member provided with a means of rigidly holding the said extended element of the said second prong shaped member in a desired extended position so as to grip the tooth to be extracted, a support adapted to rotatively support a pinion by a pin, a supplementary support pivotally attached to the said pin, and adapted to slidably and pivotally support the said extended element of the said prong shaped member, said extended element provided with teeth adapted to engage the said pinion, a bevel gear rigidly attached to the said pin, and meshing with a bevel pinion rigidly attached to a shaft rotatably supported in extended elements of the said support, a hand wheel rigidly attached to the said shaft, so as to permit the said extended element of the said prong shaped member to be extended, a vertical element of an arm, provided with an aperture adapted to slidably engage the extended element of the said prong shaped member, said arm rigidly attached to a rod slidably supported by clamps attached to the said support, a handle rigidly attached to the lower extremity of the said rod, so as to permit the said extended element of the said prong shaped member to be pivoted, so as to pull the said tooth to be extracted, a clamping member adapted to removably engage the arm of a dentist's chair, and provided with a set screw as a means of rigidly attaching the said clamping member thereto, said clamping member having threadedly attached thereto a stud having an extended element adapted to engage an aperture formed in the lower extremity of the said support, so as to pivotally support the said support.

In testimony whereof I have affixed my signature.

ANDREW VASKO.